(12) United States Patent
Poetsch

(10) Patent No.: US 6,819,459 B2
(45) Date of Patent: *Nov. 16, 2004

(54) FILM SCANNING AND FILING

(75) Inventor: Dieter Poetsch, Ober-Ramstadt (DE)

(73) Assignee: Thomson Licensing S.A., Boulogne-Billancourt (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/138,178

(22) Filed: Aug. 21, 1998

(65) Prior Publication Data

US 2002/0039204 A1 Apr. 4, 2002

(30) Foreign Application Priority Data

Aug. 28, 1997 (DE) .......................... 197 37 570

(51) Int. Cl.$^7$ ................................. G03F 3/10
(52) U.S. Cl. .................. 358/527; 348/97; 348/44; 348/47; 348/42; 369/97; 369/125; 352/11; 352/27
(58) Field of Search ................. 358/140, 500, 358/505, 527; 348/97, 441, 47, 42; 369/97, 125; 352/11, 27

(56) References Cited

U.S. PATENT DOCUMENTS

| | | | | |
|---|---|---|---|---|
| 4,306,781 A | * | 12/1981 | Mosely | 352/11 |
| 4,461,552 A | * | 7/1984 | Levine | 352/27 |
| 4,659,198 A | * | 4/1987 | Beauviala et al. | 352/92 |
| 4,875,102 A | | 10/1989 | Poetsch | 358/214 |
| 4,893,921 A | * | 1/1990 | Beauviala | 352/92 |
| 4,903,131 A | | 2/1990 | Lingemann et al. | 358/214 |
| 4,994,918 A | | 2/1991 | Lingemann | 358/214 |
| 5,327,182 A | * | 7/1994 | Kohut et al. | 352/27 |
| 5,402,166 A | * | 3/1995 | Mead et al. | 348/96 |
| 5,453,802 A | * | 9/1995 | Kohut | 352/27 |
| 5,621,489 A | * | 4/1997 | Kohut | 352/27 |
| 5,633,977 A | * | 5/1997 | Inoue | 386/46 |
| 5,710,752 A | * | 1/1998 | Seagrave et al. | 369/275 |
| 5,757,465 A | * | 5/1998 | Seagrave et al. | 352/11 |
| 6,034,720 A | * | 3/2000 | Poetsch | 348/97 |
| 6,048,066 A | * | 4/2000 | Inatome | 352/160 |
| 6,091,446 A | * | 7/2000 | Walker | 348/97 |

FOREIGN PATENT DOCUMENTS

| | | | | |
|---|---|---|---|---|
| DE | 29519279 U1 | 3/1996 | ........... | H04N/9/11 |
| GB | 2212024 A | 7/1989 | ........... | H04N/3/38 |
| GB | 2213020 | 8/1989 | ........... | H04N/3/36 |
| GB | 2243972 A | 11/1991 | ........... | H04N/3/38 |
| GB | 2244626 A | 12/1991 | .......... | H04N/5/253 |
| GB | 2244884 A | 12/1991 | ........... | H04N/3/40 |
| GB | 2305060 A | 3/1997 | ........... | H04N/3/38 |
| GB | 2328828 B | 5/2002 | .......... | H04N/5/253 |

* cited by examiner

*Primary Examiner*—Mark Wallerson
*Assistant Examiner*—Negussie Worku
(74) *Attorney, Agent, or Firm*—Joseph S. Tripoli; Ronald H. Kurdyla; Joel M. Fogelson

(57) ABSTRACT

A scanning device optically scans picture information and further information provided on an original film and makes the information available as digitized data, the scanned information not being converted into the original information contents. A storage device stores the data obtained from the film scanner as digital data, and a display device separates data reproduced by the storage device in accordance with their original location on the original film and makes them available as separate data signals.

20 Claims, 1 Drawing Sheet

FILM SCANNING AND FILING

BACKGROUND OF THE INVENTION

The invention relates to a system for filing cinematographic film material. The invention also relates to a film scanner, a display device for such a filing system, the data carrier used, and to a filing method.

Due to ageing, the picture and sound quality, particularly of very old films, deteriorates to such an extent that the master copy is no longer usable. To avoid complete loss, photographic copies may be made over longer periods of time, but every copying process then also involves a loss of quality. To maintain at least the quality which is available, cinematographic films are filed as digital copies on appropriate data carriers such as magnetic tapes. It is true that magnetic recordings have a limited lifetime, but copies can be made without any loss from digitally stored information.

To manufacture a digital master for filing a cinematographic film, the picture information stored on the film is scanned in film scanners by means of a scanning device, and the sound information on an optical sound track is scanned by means of a separate sound-scanning device. In so far as the film scanner used ensures electronic stabilization of the frame position, for example, also the edges of each film frame are scanned with the scanning device or, for example, the positions of the sprocket holes are scanned as reference marks by means of scanning devices provided for this purpose. The offset is computed individually for each frame from the deviation of the reference marks, and the picture position of each frame scanned is corrected by means of, for example, a digital video effect apparatus, before it is supplied for further processing or storage. Similarly, the sound scanning values obtained during sound scanning are converted into an analog or digital audio signal before they are supplied. Any further information provided on the film, such as, for example, film time code and key code may be scanned and their information contents may be stored as digital data equivalents.

Since it is generally desired to save as much cinematographic art as possible from further deterioration, the preservation of film material in the state in which it is found is in the limelight of interest, whereas a time-consuming and capital-intensive restoration for the purpose of preserving a maximal number of films is postponed. Generally, the film material is done away with after filing, for at a later stage, for example, during restoration, it has suffered from a further loss of quality anyway, or may even have become unusable.

SUMMARY OF THE INVENTION

It is an object of the present invention to provide a system for filing cinematographic films, with which the optimal quality state is ensured at any time of restoration.

In a filing system, this object is achieved by way of the characteristic display at a later stage, particularly for purposes of restoration by means of film material digitally filed in the conventional manner, may not benefit from all technical facilities of the display and restoration technique at this future stage, because the current filing technique may have led to an irretrievable loss of given information required for techniques which have not been developed, or even conceived yet. Storage of the scanning values of a maximal amount of individual information provided on a cinematographic film at least offers an opportunity to evaluate the information at a later stage as if the film were scanned at the time of display or restoration. In this method, it is not necessary to stabilize the frame position, because information for later frame position correction is maintained. Particularly the storage of the optical sound track as its digitized optical image allows a quasi-optical rectification, for example, by means of two-dimensional filtering of the optical sound track for the purpose of covering film dirt and film scratches, as is already conventional practice for the film frames themselves, but not yet for the optical sound track.

It is therefore particularly advantageous to scan the film throughout its width and preferably continuously in the film travel direction, i.e. without any interruption of scanning in between the frames, because all optically detectable information is filed in this way, particularly information about the film edges and the sprocket hole position, and information which may have been provided between the sprocket holes, such as, for example, film time code, key code, in the intermediate areas of the sound tracks, in the area of the frame line, as well as information about the position of the boundaries of the individual frames and possibly other marks provided outside the frames and optical sound tracks.

Due to the enormous quantity of data for this first-mentioned solution, it is proposed for reasons of economy to detect at least the most essential information by means of separate scanning sensors and store this information as digitized optical images, rather than store only the original analog or digital information contents determined from the scanning value, as has hitherto been conventional practice. In addition to the hitherto customary scanning values of the film frames, these information contents would also comprise at least the scanning values of the optical sound track and possibly the scanning values of at least a sprocket hole assignable to each film frame.

This variant of the invention has the advantage that a split-up of the scanning device into a plurality of scanning devices which can be arranged individually and assigned to scanning given areas of a film to be scanned imposes less stringent requirements as regards the resolution of the scanning devices than would be the case for a single scanning device.

DETAILED DESCRIPTION OF THE PREFERRED EMBODIMENT

Figure 1:
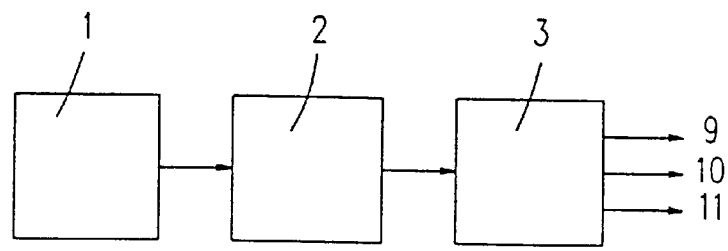
FIG. 1 is a block diagram of the system.
Figure 2:
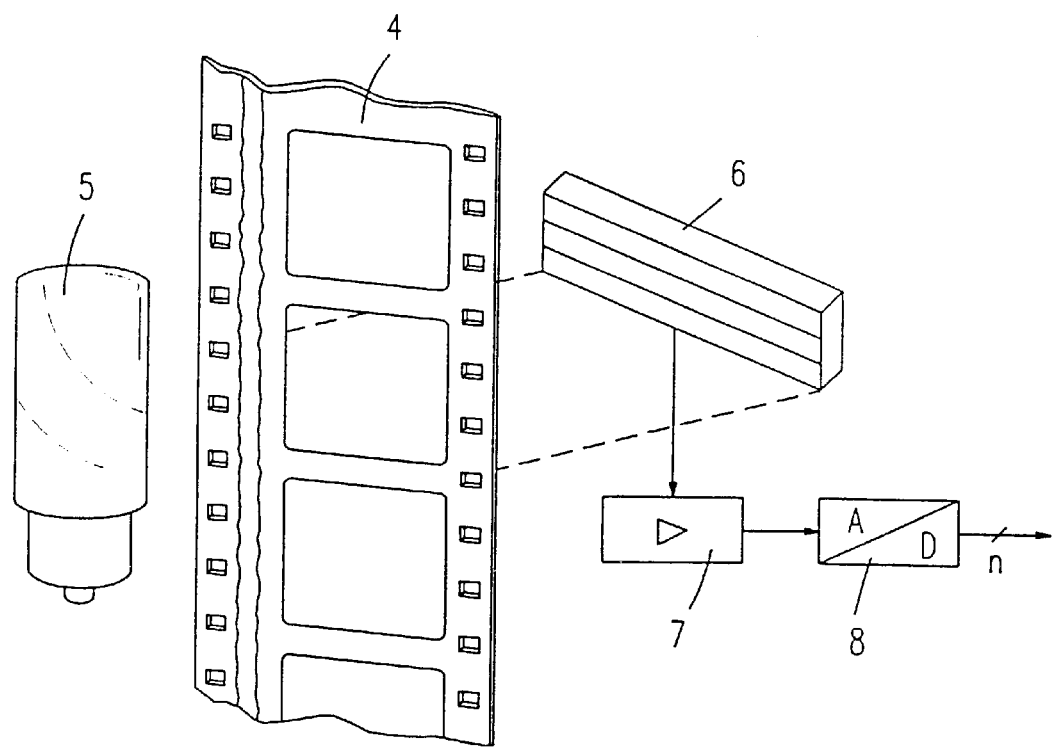
FIG. 2 shows a film scanner scanning throughout the width of a film.

The filing system shown in FIG. 1 comprises a film scanner 1, a device 2 for storing the scanned film data, and a post-processing station 3. FIG. 2 shows diagrammatically the structure of a film scanner according to the invention, in which a film 4 to be filed is illuminated by an illumination device 5. In this embodiment of the film scanner, the film transport is preferably effected continuously, as also the information between the individual film frames can in this way be scanned most easily because there are no extra positioning errors due to a mechanical transport of individual frames. Since the film is stored anyway, the film transport may be effected at a transport rate which is reduced with respect to real-time display, so that a greater film transport accuracy is achieved. By means of a CCD line sensor 6, which preferably has a horizontal resolution of 4000 to 5000 pixels per line, the film 4 is scanned in RGB format throughout its width, amplified in an amplifier stage 7 and converted into a digital output signal by means of an A/D converter 8. Each scanned line can be stored in blocks by way of synchronous information, so that each data word within a block is assignable to a given position on the film.

The film scanner 1 has a digital interface to which the storage device 2 can be connected. Preferably, the digitized scanning values, at best up to relatively basic processing steps in the amplifier stage 7, such as, for example, dynamic brightness control, gamma correction or color correction, are unprocessed so that possibly original data are found for processing operations at a later stage. The storage device 2, for example, a magnetic tape station or a storage device based on DVD (Digital Versatile Disk) stores the data as digital data, rather than in an existing television format such as PAL or NTSC, as has hitherto been conventional practice.

When the filed data are displayed, the individual information components are separated in the post-processing station 3, as if these components were to originate directly from a customary film scanner. Since each data word within a data block is assignable to a given position on the filed film, for example, the scanning values of the sprocket holes, the optical sound tracks and the film frame can be separated very easily and made available as separate data signals 9, 10, 11 for post-processing operations, as if they were to originate directly from a film scanner. This has the advantage that an arrangement of a type customarily connectable to a film scanner can be used.

What is claimed is:

1. Method for filing cinematographic film material having picture information and additional information at respective locations on said film, comprising the steps of;

optically scanning said film across its width to form digitized data representing information present on said film across its said width;

storing said digitized data as digital data; and, generating separate data signals from the stored digital data in accordance with said respective locations on said film, wherein said dialtized data includes picture information and additional information representative of optical sound tracks and sprocket holes.

2. Method as in claim 1 wherein said digitized data is stored as scanned.

3. Method as in ciaim 1 wherein said digitized data includes picture Information representative of Images contained in frames of said film.

4. Method as in claim 1 wherein picture information and additional information are scanned by separate scanners.

5. Method as in claim 1, wherein said additional information is stored without being converted into different physical values.

6. Apparatus for filing cinematographic film material comprising picture information and additional information having respective locations one with the other on a film, said apparatus comprising;

film scanning means which optically scans said picture information and said additional information, and makes said information available as digitized data, wherein said digitized data comprises information representative of sprocket holes of said film material;

a storage device which stores the digitized data as digital data; and, a display device coupled to said storage device for generating separate data signals from the stored digital data in accordance with the respective locations on the film.

7. Apparatus as in claim 6 wherein said storage device stores said digitized data as scanned.

8. Apparatus as in ciaim 6 wherein said film scanning means comprises a first scanning device for the picture information and a second scanning device for the additional information.

9. The apparatus of claim 6, wherein one of said separate data signals corresponds to a signal representative of sound information.

10. The apparatus of claim 6, wherein one of said separate data signals corresponds to a signal representative of frame boundary information.

11. A method for forming a record of cinematographic film material having sound and picture information and additional information adjacently Located across a width of said film, said method comprising the steps of:

optically scanning said film material and forming at least one signal representative of said sound, picture and additional information;

digitizing said at Least one signal to form digital data representative of said sound, picture and additional information; and, storing said digital data from which said sound and said picture information can be reproduced as scanned or corrected in accordance with said additional information wherein said additional information includes information representative of picture position.

12. The method of claim 11, wherein said storing further comprises the step of;

generating separate data signals from said the stored digital data in accordance with adjacent locations of said sound, picture and additional information across said film material.

13. The method of claim 11 wherein said optically scanning step includes the further step of:

optically scanning said film material across the width and forming a signal representative of sound and picture information and additional information.

14. The method of claim 11 wherein said optically scanning step includes the further step of:

optically scanning said film material continuously in a direction of travel without interruption.

15. The method of claim 11 wherein said optically scanning step includes the further step of:

optically detecting sprocket holes in said film material by said optically scanning.

16. The method of claim 11 wherein said optically scanning step includes the further step of:

optically detecting information regarding edges of said film material.

17. The method of claim 11 wherein said optically scanning step includes the further step of:

optically detecting information between picture information areas of said film material.

18. The method of claim 11 wherein said optically scanning step includes the further step of:

determining positional information of frame boundaries on said film material by said optically scanning.

19. The method of claim 11 wherein said optically scanning step includes the further step of:

optically scanning said additional information separately from said picture and sound information.

20. The method of ciaim 11, wherein said optically scanning step includes the further step of:

transporting said film material for optical scanning at rate reduced relative to a rate for real time display.

* * * * *

UNITED STATES PATENT AND TRADEMARK OFFICE
CERTIFICATE OF CORRECTION

PATENT NO. : 6,819,459 B2
DATED : November 16, 2004
INVENTOR(S) : Dieter Poetsch It is certified that error appears in the above-identified patent and that said Letters Patent is hereby corrected as shown below:

Column 3,
Line 38, "dialtized" should read -- digitized --

Column 4,
Line 18, "Least" should read -- least --.

Signed and Sealed this

Eighteenth Day of January, 2005

JON W. DUDAS
*Director of the United States Patent and Trademark Office*